United States Patent [19]

DuBois, Sr.

[11] Patent Number: 4,676,003

[45] Date of Patent: Jun. 30, 1987

[54] INTERCHANGEABLE SPACER GAUGE

[76] Inventor: Russell E. DuBois, Sr., 142 Chippewa, Clawson, Mich. 48017

[21] Appl. No.: 849,837

[22] Filed: Apr. 9, 1986

[51] Int. Cl.$^4$ .............................................. G01B 3/30
[52] U.S. Cl. .................................................. 33/168 R
[58] Field of Search ...................................... 33/168 R

[56] References Cited

U.S. PATENT DOCUMENTS

| | | | |
|---|---|---|---|
| 69,953 | 10/1867 | Richards | 33/168 R |
| 1,267,704 | 5/1918 | Skrukrud . | |
| 1,472,837 | 11/1923 | Hoke | 33/168 R |
| 2,198,288 | 4/1940 | Leaman | 77/55 |
| 2,216,988 | 10/1940 | Schmidt | 77/55 |
| 2,402,353 | 6/1946 | Trautmann | 77/73.5 |
| 2,607,125 | 8/1952 | Johansson | 33/168 R |
| 3,287,813 | 11/1966 | Lennon et al. | 33/168 R |
| 3,516,327 | 6/1970 | Wilson | 90/11 |
| 3,653,780 | 4/1972 | Ammatuna | 408/241 |
| 4,168,131 | 9/1979 | Hill | 408/1 R |

Primary Examiner—Willis Little
Attorney, Agent, or Firm—Basile, Weintraub & Hanlon

[57] ABSTRACT

An interchangeable spacer gauge having a body with an upper surface parallel to a lower surface, a side surface, and an opening in the side surface extending through the upper and lower surfaces for use with an elongated member having an outer periphery, and more particularly, the opening enables a spacer gauge of a predetermined height to be interchanged with a second spacer gauge of a different predetermined height by passing the outer periphery of the elongated member through the opening in the side surface thereby encompassing a substantial portion of the outer periphery of the elongated member, the parallel upper and lower surfaces of the body allow a plurality of spacer gauges of different predetermined heights to be stacked by having the upper surface of a lower spacer gauge contacting the lower surface of a second spacer gauge to obtain a predetermined aggregate height.

9 Claims, 5 Drawing Figures

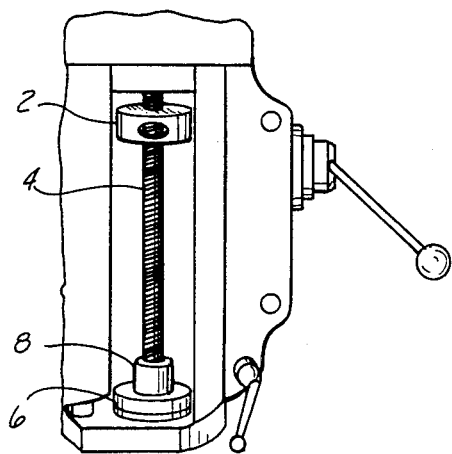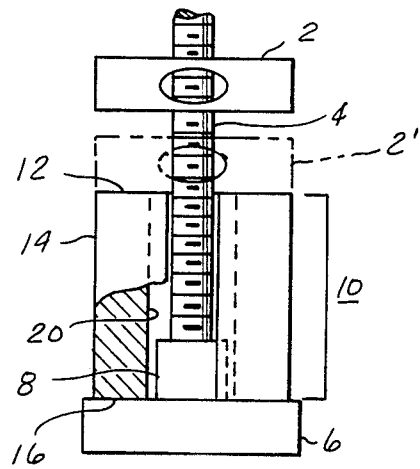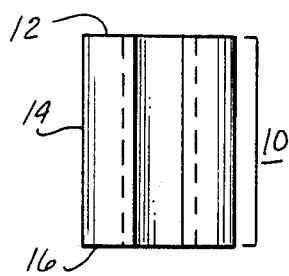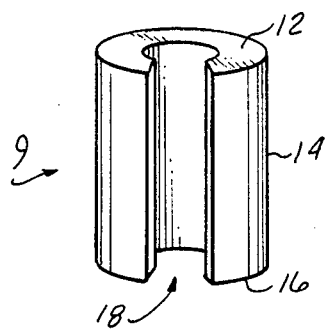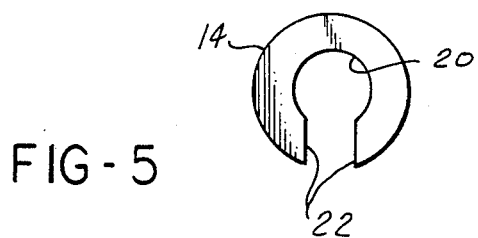
FIG-1
FIG-2
FIG-4
FIG-3
FIG-5

INTERCHANGEABLE SPACER GAUGE

BACKGROUND OF THE INVENTION

1. Field of The Invention

This invention relates to a spacer gauge for use with a machine tool having a stroke limiting apparatus with a movable lug traveling along an elongated member and a stop device to limit the distance of travel. More particularly, the spacer gauge has a predetermined height to accurately gauge the distance of travel of the stroke limiting apparatus, and the side surface of the spacer gauge has an opening enabling the operator of the machine tool to rapidly interchange spacer gauges of different heights to control the distance of travel, thereby increasing productivity and consistency. The spacer gauge can also be used to elevate the work above a table upon which the work is placed for machining purposes, thereby allowing machining operations through the entire depth of the work and preventing damage to the table top.

2. Description of the Prior Art

In machining operations it is often necessary to control the depth of a bore or cut precisely, and the same workpiece may require bores having different depths, for instance counter sunk bores. To facilitate the machining operations, it is desirable to have means whereby the depth of the bore can be accurately set and readily changed during the course of production. Conventional milling machines, for instance the Mill Port Company milling machine, have incorporated a lower stop device on a threaded rod, which limits the distance of travel of a movable lug which travels along the threaded rod corresponding to the elevation of the spindle. In order to adjust the elevation of the stop device, it is necessary to rotably turn the stop device about the threaded rod thereby causing an incremental change in elevation corresponding to the number of rotations and the number of threads per inch. The rotational activation of the lower stop device is time consuming and inefficient when numerous changes in the depth of the bore or cut are required.

SUMMARY OF THE INVENTION

In order to increase productivity and consistency in depth, it is desirable to rapidly change the depth of the bore or cut in a uniform manner. This objective is fulfilled by providing a plurality of spacer gauges manufactured to specified heights of varying dimensions corresponding to the appropriate depth of bore or cut required. The spacer gauges are readily interchangeable by means of an opening in the side surface whereby the spacer gauge can be mounted by passing the threaded rod through the opening in the side surface matingly coupling the spacer gauge to a shoulder of the lower stop device.

The invention can also be used to elevate the work above a table upon which the work is placed for machining purposes. In this instance spacer gauges of uniform size are placed between the table and the work piece, in order to allow machining operations through the entire depth of the work thereby preventing damage to the tabletop. Additional uses will be obvious to those skilled in the art upon examining the remainder of the application.

BRIEF DESCRIPTION OF THE DRAWINGS

FIG. 1 depicts the depth limiting apparatus of a conventional vertical milling machine in perspective.

FIG. 2 is an elevational view showing the placement of the spacer gauge and its interaction with the components of the depth limiting apparatus.

FIG. 3 is a perspective view of the spacer gauge.

FIG. 4 is an elevational view of the spacer gauge.

FIG. 5 is a top view of the spacer gauge.

DESCRIPTION OF THE PREFERRED EMBODIMENT

Referring to FIG. 1, numerous machining tools, such as milling machines, drill presses, or lathes, use a depth limiting apparatus 1 to accurately gauge the depth of a bore or cut. For purposes of depicting the invention, FIG. 1 shows the depth limiting apparatus 1 of a conventional vertical milling machine. The depth limiting apparatus 1 shown includes a movable lug 2 traveling along an elongated member 4, such as a threaded rod, until it comes into contact with a lower stop device 6. The depth limiting apparatus depicted can be adjusted by rotating the lower stop device 6 having inner threads matingly contacting the outer threads of the elongated member 4, thereby causing an incremental change in the set depth corresponding to the direction of rotation, number of rotations, and number of threads per inch. The lower stop device 6 depicted includes a shoulder 8 which encompasses the entire periphery of the elongated member to a predetermined height.

Referring now to FIGS. 2, 3, and 4, there is illustrated a spacer gauge 9 comprising a body 10 having an upper surface 12 parallel to a lower surface 16 and a circular side surface 14. The side surface 14 has an opening 18 passing through the upper surface 12 and lower surface 16 providing means for detachably mounting the spacer gauge as further described below. The opening 18 for illustrative purposes, referring now to FIG. 5, comprises a bore 20 passing through the spacer gauge body 10 including the upper surface 12 and lower surface 16, which is in communication with a slot 22 defined by two spaced side walls. The slot 22 is in communication with the circular side surface 14, and the bore 20, thereby providing an opening of sufficient width to pass the outer periphery of the elongated member 4 through the slot 22. Lowering the spacer gauge until the shoulder 8, of the lower stop device 6 shown in FIG. 2, matingly couples within the bore 20 of the spacer gauge, places the spacer guage in an operative position. This detachable mounting means enables a first spacer gauge of a predetermined height to be interchanged with a second spacer gauge of a different predetermined height.

In the operative position described above, the spacer gauge limits the distance of travel of a movable lug 2 when it reaches the position 2' shown in phantom in FIG. 2, which corresponds to the distance of travel of the spindle. It is also possible to stack a plurality of spacer gauges to obtain an aggregate predetermined height by having the upper surface 12 of a first spacer gauge contacting the lower surface 16 of a second spacer gauge.

The side surface 14 can be textured or knurled to provide a reliable gripping surface and can be any geometric shape. The shape of side surface 14 being limited such that it will fit within the space surrounding the elongated member 4 in the depth limiting apparatus 1 of the particular machine tool. The opening 18 does not have to be the combination of a bore 20 and a slot 22. The bore 20 and slot 22 combination could be replaced with a slot opening defined by a plurality of side walls extending through the upper and lower surfaces in communication with the side surface 14. In addition, the bore 20 and slot 22 could be replaced with an opening 18 in the side surface 14 defined by a bore extending through the upper and lower surfaces in communication with the side surface 14, such that the opening 18 in the side surface 14 is of sufficient width to pass the outer periphery of the elongated member 4 through the opening.

The spacer gauge 9 can also be used to elevate the work above a table on which it is placed for machining purposes, thereby allowing machining operations through the entire depth of the work and preventing damage to the table top. This particular use of the spacer gauge 9 can be accomplished in the following manner. A plurality of spacer gauges, preferably three or more, of the same predetermined height are spaced between the work piece and the table top. An elongated member 4, such as a threaded bolt may be used to secure the piece to the table top by passing the outer periphery of the elongated member 4 through the opening 18 in the side surface 14 of the spacer gauge 9. The spacer gauges elevate the piece above the table top in order to allow machining operations through the entire depth of the work and prevent damage to the table top. In this particular use, a plurality of spacer gauges may be stacked to obtain an aggregate predetermined height of the work piece above the table top. This would be accomplished in the same manner as described above by having the upper surface 12 of a first spacer gauge contacting the lower surface 16 of a second spacer gauge. For this particular use, the side surface 14 of the spacer gauge 9 is not required to be circular in shape. Any geometric shape, such as square, circular, rectangular, etc. would be suitable. The opening 18 in the side surface 14 for this use would not be limited to the combination of a bore 20 and slot 22. Any opening extending through the side surface and the body, such as a bore individually or a slot individually would be suitable for this use of the spacer gauge 9. The side surface 14 of the spacer gauge 9 could be textured or knurled for this use to provide a slip resistant surface for gripping.

What is claimed is:

1. In a machine tool stroke limiting device of the type having: an elongated member having an outer periphery thereof and a diameter d; a lug movable along the longitudinal axis of the elongated member, said lug movement corresponding to a movement of the machine tool; and a stop device adapted to limit the distance travelled along the longitudinal axis of the elongated member by the lug disposed around the elongated member normally adjacent an end thereof, said stop device having a shoulder portion with an outside diameter D and an end portion with an outside diameter substantially greater than D, the combination with the stop device of an interchangeable spacer gauge comprising:

a hollow body having parallel, substantially flat first and second faces defining a predetermined height therebetween and a side wall integral therewith, said side wall comprising an external surface and an internal surface, said internal surface communicating with the first and second faces and having a width as measured in a plane parallel thereto slightly greater than D, whereby the internal surface is large enough to engage both the elongated member and the shoulder portion of the stop device; and an aperture extending through the side wall and communicating with the first and second faces and having a width as measured in a plane parallel thereto greater than d but less than D, whereby the aperture is large enough to engage the elongated member but is too small to engage the shoulder portion of the stop device, wherein the spacer gauge may be removably mounted on the shoulder portion of the stop device by first successively engaging the aperture and the internal surface with the elongated member, and then sliding the spacer gauge along the elongated member in a direction toward the end thereof carrying the stop device until the internal surface of the spacer gauge is matingly coupled with the shoulder portion of the stop device; thereby limiting the distance the lug is movable along the elongated member by the predetermined height.

2. The spacer gauge of claim 1 wherein a plurality of spacer gauges are stackable to obtain a variety of predetermined heights by having a face of a first spacer gauge in contact with a face of a second spacer gauge.

3. The spacer gauge of claim 1 wherein the external surface of the side wall defines a cylinder.

4. The spacer gauge of claim 1 wherein the external surface of the side wall is textured.

5. The spacer gauge of claim 1 wherein the aperture is defined by a plurality of side wall segments extending through the first and second faces.

6. The spacer gauge of claim 1 wherein the internal surface defines a bore extending through the upper and lower faces.

7. The spacer gauge of claim 6 wherein the aperture comprises a slot opening defined by two spaced side wall segments extending through the first and second faces, and the internal surface defines a bore extending through the body of the spacer gauge, the two spaced side wall segments communicating with the side wall and the bore.

8. In a machine tool stroke limiting device of the type having: an elongated member having an outer periphery thereof and a diameter d; a lug movable along the longitudinal axis of the elongated member, said lug movement corresponding to a movement of the machine tool; and a stop device adapted to limit the distance travelled along the longitudinal axis of the elongated member by the lug disposed around the elongated member normally adjacent an end thereof, said stop device having a shoulder portion with an outside diameter D and an end portion with an outside diameter substantially greater than D, the combination with the stop device of an interchangeable spacer gauge comprising:

a cylindrical, hollow bored body having parallel, substantially flat first and second faces defining a predetermined height therebetween and a side wall integral therewith, said side wall comprising an external surface and an internal surface, said internal surface communicating with the first and second faces and having a diameter slightly greater than D, whereby the internal surface is large enough to engage both the elongated member and the shoulder portion of the stop device; and a slot opening defined by two spaced side wall segments extending through the side wall and communicating with the first and second faces and having a width as measured in a plane parallel thereto greater than d but less than D, the two spaced side wall segments communicating with the side wall and the bore, whereby the slot is large enough to engage the elongated member but too small to engage the shoulder portion of the stop device, wherein the spacer gauge may be removably mounted on the shoulder portion of the stop device by first successively engaging the slot and internal surface with the elongated member and then sliding the spacer gauge along the elongated member in a direction toward the end thereof carrying the stop device until the internal surface of the spacer gauge is matingly coupled with the shoulder portion of the stop device, thereby limiting the distance the lug is movable along the elongated member by the predetermined height.

9. A method for limiting a stroke of a machine tool of the type including an elongated member having an outer periphery thereof and a diameter d, a lug movable along the longitudinal axis of the elongated member, said lug movement corresponding to a movement of the machine tool and a stop device adapted to limit the distance travelled along the longitudinal axis of the elongated member by the lug disposed around the elongated member adjacent an end thereof, said stop device having a shoulder portion with an outside diameter D and an end portion with an outside diameter substantially greater than D, comprising the steps of:

providing an interchangeable spacer gauge having:

a hollow body with parallel, substantially flat first and second faces defining a predetermined height therebetween and a side wall integral therewith, said side wall comprising an external surface and an internal surface, said internal surface communicating with the first and second faces and having a width as measured in a plane parallel thereto slightly greater than D, whereby the internal surface is large enough to engage both the elongated member and the shoulder portion of the stop device; and an aperture extending through the side wall and communicating with the first and second faces and having a width as measured in a plane parallel thereto greater than d but less than D, whereby the aperture is large enough to engage the elongated member but too small to engage the shoulder portion of the stop device, mounting the spacer gauge on the shoulder portion on the stop device by first successively engaging the aperture and the stop device with the elongated member and then sliding the spacer gauge along the elongated member in a direction toward the end thereof carrying the stop device until the internal surface of the spacer gauge is matingly coupled with the shoulder portion of the stop device;

initiating at least one stroke of the machine tool whereby the lug travels along the longitudinal axis of the elongated member from a start position at the end of the elongated member opposite the end carrying the stop device to a position where the lug contacts a face of the interchangeable gauge, thereby limiting the distance the lug has travelled along the elongated member by the predetermined height; and returning the lug to the start position.

* * * * *